United States Patent [19]

Honda

[11] Patent Number: 5,644,659
[45] Date of Patent: Jul. 1, 1997

[54] PATTERN OUTPUT APPARATUS

[75] Inventor: Kazuyuki Honda, Yokohama, Japan

[73] Assignee: Canon Kabushiki Kaisha, Tokyo, Japan

[21] Appl. No.: 430,621

[22] Filed: Apr. 28, 1995

Related U.S. Application Data

[63] Continuation of Ser. No. 158,372, Nov. 29, 1993, abandoned, which is a continuation of Ser. No. 68,315, May 28, 1993, abandoned, which is a continuation of Ser. No. 888,303, May 27, 1992, abandoned, which is a continuation of Ser. No. 645,703, Jan. 25, 1991, abandoned.

[30] Foreign Application Priority Data

Jan. 30, 1990 [JP] Japan .................................. 2-019727

[51] Int. Cl.$^6$ .................................................. G06K 9/36
[52] U.S. Cl. .................................. 382/276; 382/297
[58] Field of Search .............................. 382/276, 282, 382/283, 297; 345/133, 144; 395/140, 141, 143

[56] References Cited

U.S. PATENT DOCUMENTS

| 4,695,834 | 9/1987 | Gojo et al. .............................. 340/734 |
|---|---|---|
| 4,806,921 | 2/1989 | Goodman et al. ........................ 340/747 |
| 4,849,907 | 7/1989 | Aotsu et al. ............................. 364/518 |
| 4,870,397 | 9/1989 | Soto et al. ............................... 340/747 |
| 4,876,562 | 10/1989 | Suzwki et al. .......................... 346/160 |
| 4,924,410 | 5/1990 | Hamada ................................... 340/747 |
| 4,928,243 | 5/1990 | Hodges et al. .......................... 340/747 |
| 4,951,227 | 8/1990 | Todd ....................................... 364/518 |

*Primary Examiner*—Leo Boudreau
*Assistant Examiner*—Phuoc Tran
*Attorney, Agent, or Firm*—Fitzpatrick, Cella, Harper & Scinto

[57] ABSTRACT

An output apparatus to generate a decoration rule pattern comprises: a memory to store data indicative of a kind of pattern to be generated and data indicative of an output position of the pattern; and a making circuit to make a pattern on the basis of the data indicative of the kind of the pattern to be generated and the data indicative of the output position which are stored in the memory, wherein the making circuit continuously makes a plurality of units of the pattern to be generated, makes a rotation pattern (rotated version) of the unit, and makes a pattern of an edge portion of the pattern to be generated from the unit. With the apparatus, a decoration rule pattern can be drawn at the high speed and with high quality by rotating a pattern and repetitively generating a pattern.

19 Claims, 8 Drawing Sheets

FIG. 3

[ESC] P;<PATTERN NO>;<WIDTH>;<HEIGHT>;(PATTERN DATA)

[ESC] P;1;31;8;X'0E' X'00' X'00' X'00' X'3B' X'80'---X'80'

[ESC] ---X'1B'

(UP TO FINAL POSITION)

(RULE PATTERN)

(INITIAL PATTERN)

(1)　　　　　　　　　(2)

(FINAL PATTERN)  
　　　　　　　　　　　　　　　　　　　　Ⓐ

(INITIAL MASK) 
BIT "1"
BIT "0"

(2')
NEXT INITIAL PATTERN 
Ⓑ

(FINAL MASK)

FIG. 10

PATTERN OUTPUT APPARATUS

This application is a continuation, of application Ser. No. 08/158,372, filed Nov. 29, 1993, now abandoned, which was a continuation of application Ser. No. 08/068,315, filed May 28, 1993, now abandoned, which was a continuation of application Ser. No. 07/888,303, filed May 27, 1992, now abandoned, which was a continuation of application Ser. No. 07/645,703, filed Jan. 25, 1991, now abandoned.

BACKGROUND OF THE INVENTION

1. Field of the Invention

The present invention relates to an output apparatus and, more particularly, to an output apparatus to generate a line pattern such as a rule line or the like.

2. Related Background Art

Hitherto, to generate a line pattern such as a rule line, a character pattern such as "213D" or "I" is commonly used and generated in place of such a line pattern, or a graphic function in an output apparatus is used, or a function of an image output (rather than character output) is used.

Figure 2:
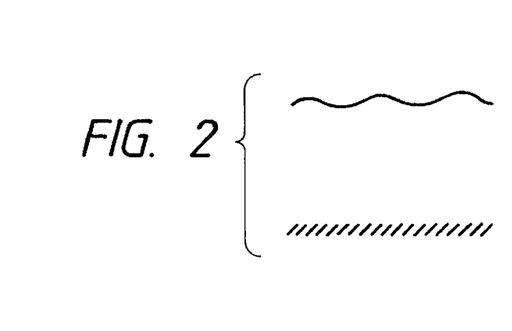
FIG. 2 shows an example of a decoration rule line.

However, in the above conventional methods, in the case of generating what is called a decoration rule line as shown in FIG. 2, the generation itself cannot be performed or such a decoration rule line can be generated only as an image output, so that there are that drawbacks that it takes a time to transfer an image and that a long time is needed before the generation can be performed and completed.

SUMMARY OF THE INVENTION

It is an object of the invention to provide an output apparatus which overcomes the above drawbacks.

According to one aspect of the invention is provided an output apparatus in which only a dot pattern serving as an original of a decoration rule line is stored and the pattern is repetitively generated, thereby drawing a rule line at a high speed.

According to another aspect of the invention is provided an output apparatus which also draws a rectangular output by a decoration rule line at a high speed by providing rotating means for rotating a pattern, counter means for holding information regarding whether a process at which position of the pattern is executed, and processing means for processing a line edge.

In consideration of the above problems, it is another aspect of the invention to provide an output method comprising the steps of: continuously making a plurality of units of a pattern to be output; making rotation patterns of the units; and making patterns of edge portions of the pattern to be output from the units, wherein a decoration rule line is generated at a high speed and with high quality.

In consideration of the above problems, still another aspect of the invention is to provide an output apparatus comprising: storing means for storing data indicative of a kind of pattern to be output and data indicative of an output position; and making means for making a pattern on the basis of the data indicative of the kind of the pattern to be output and the data indicative of the output position which are stored into the storing means, wherein a decoration rule line is generated at a high speed and with high quality.

DETAILED DESCRIPTION OF THE PREFERRED EMBODIMENTS

Figure 1:
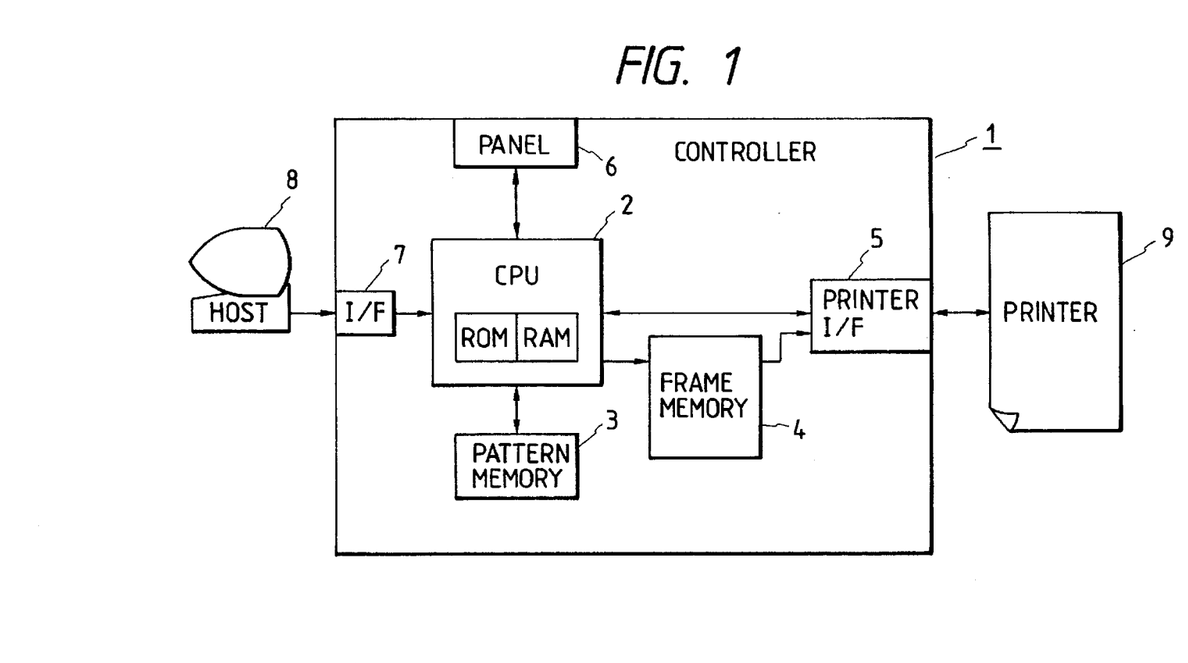
FIG. 1 is a block diagram showing an embodiment of the invention.

FIG. 1 is a block diagram of an output apparatus according to the invention. In the diagram, reference numeral 1 denotes a controller of the output apparatus and 2 indicates a CPU comprising a microprocessor to control the output apparatus. The CPU 2 has a ROM in which a control program, which will be explained hereinbelow, to control operation of the apparatus and character patterns for generation have been stored and a RAM to store control information (particularly, output position of a rule line).

Reference numeral 3 denotes a pattern memory comprising a RAM to store decoration rule patterns; 4 a frame memory to store dot patterns of one page; 5 a printer interface for converting the dot information in the frame memory 4 into an on/off signal of a laser beam which is used in a laser beam printer and for executing the conversion to transmit to and receive the information from the printer; 6 a panel for instructing the output apparatus to perform various operations and displaying a state of the output apparatus; and 7 an interface circuit to connect with various computers. For instance, an interface circuit RS-232C can be used. Reference numeral 8 denotes a host computer as a generation source of output data and 9 indicates a printer.

In the above structure, print data and a control command from the host computer 8 are supplied to the CPU 2 through the interface 7. The CPU 2 stores each of the print data and rule data into the RAM in the CPU 2. When the CPU 2 receives a page change code or data as much as the number of lines of one page, the making process in the page buffer of one page is finished. After that, the dot patterns of one page are formed in the frame memory 4 on the basis of the information in the page buffer.

Figure 10:
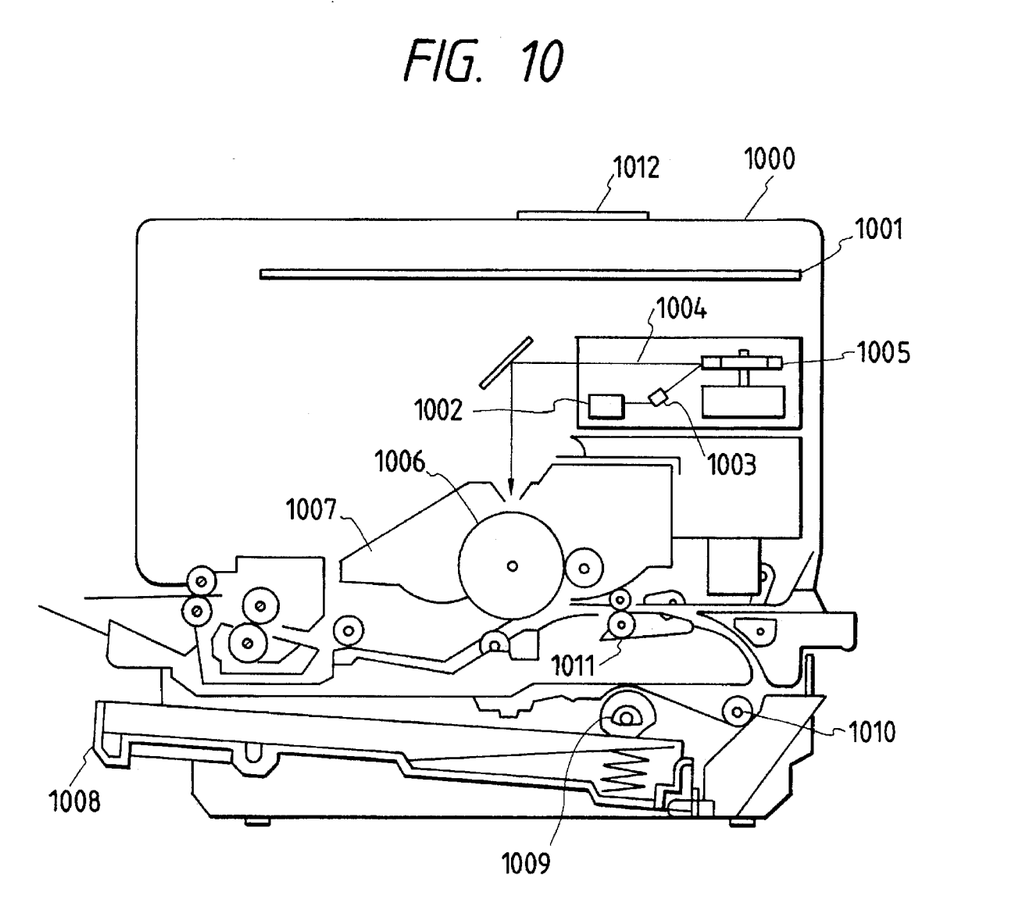
FIG. 10 is a diagram showing a structure of a laser beam printer.

After completion of the development of the patterns of one page, the CPU 2 feeds a paper from a paper cassette (1008 which will be explained hereinlater) by a paper feed instruction via the printer interface 5. After that, the printer interface 5 converts a dot pattern in the frame memory into an on/off serial signal for a laser beam in accordance with timing of movement of the paper. A toner image is formed in accordance with the serial signal by a well-known electrophotographing technique and is fixed. A final output is derived on the paper by the above flow.

Figure 3:
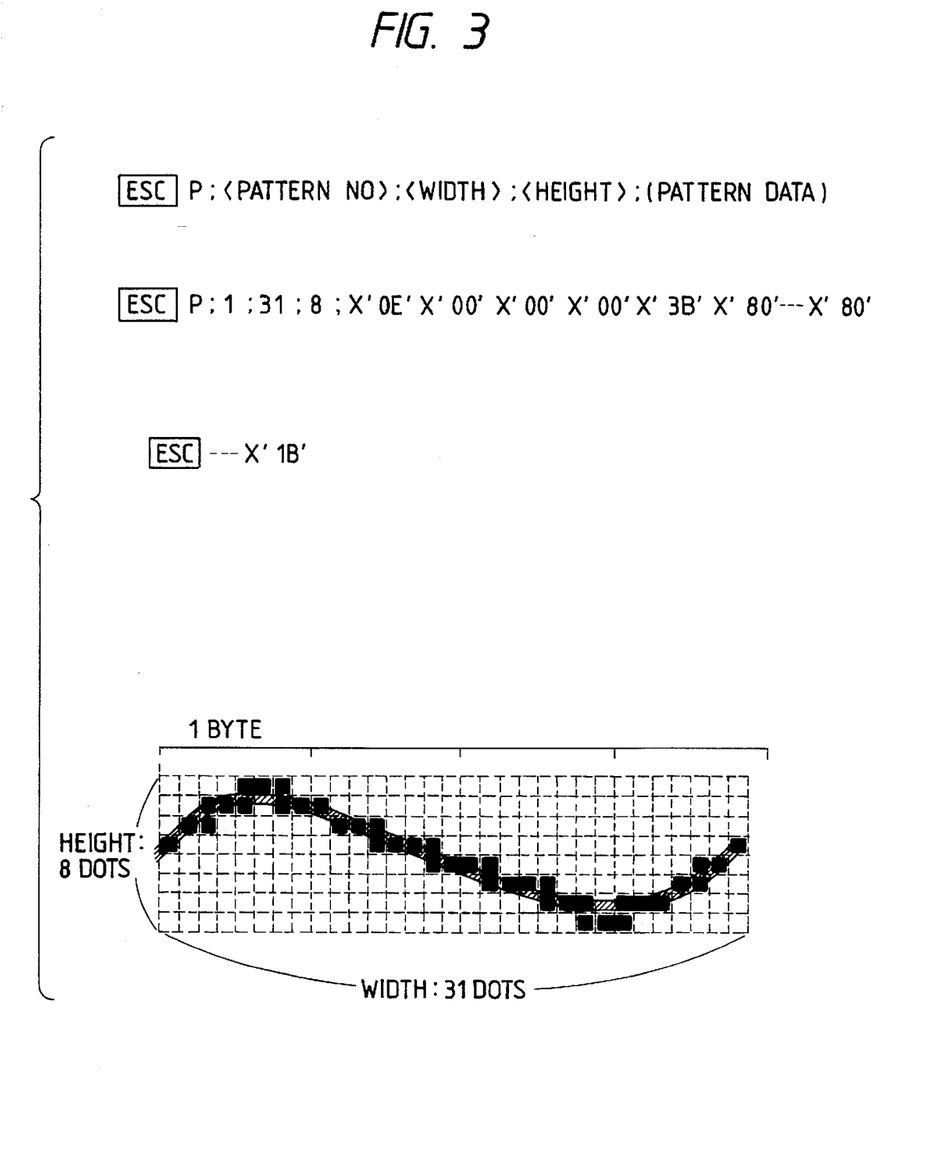
FIG. 3 shows a format of a pattern registration command of a decoration rule line and an example thereof.
Figure 4:
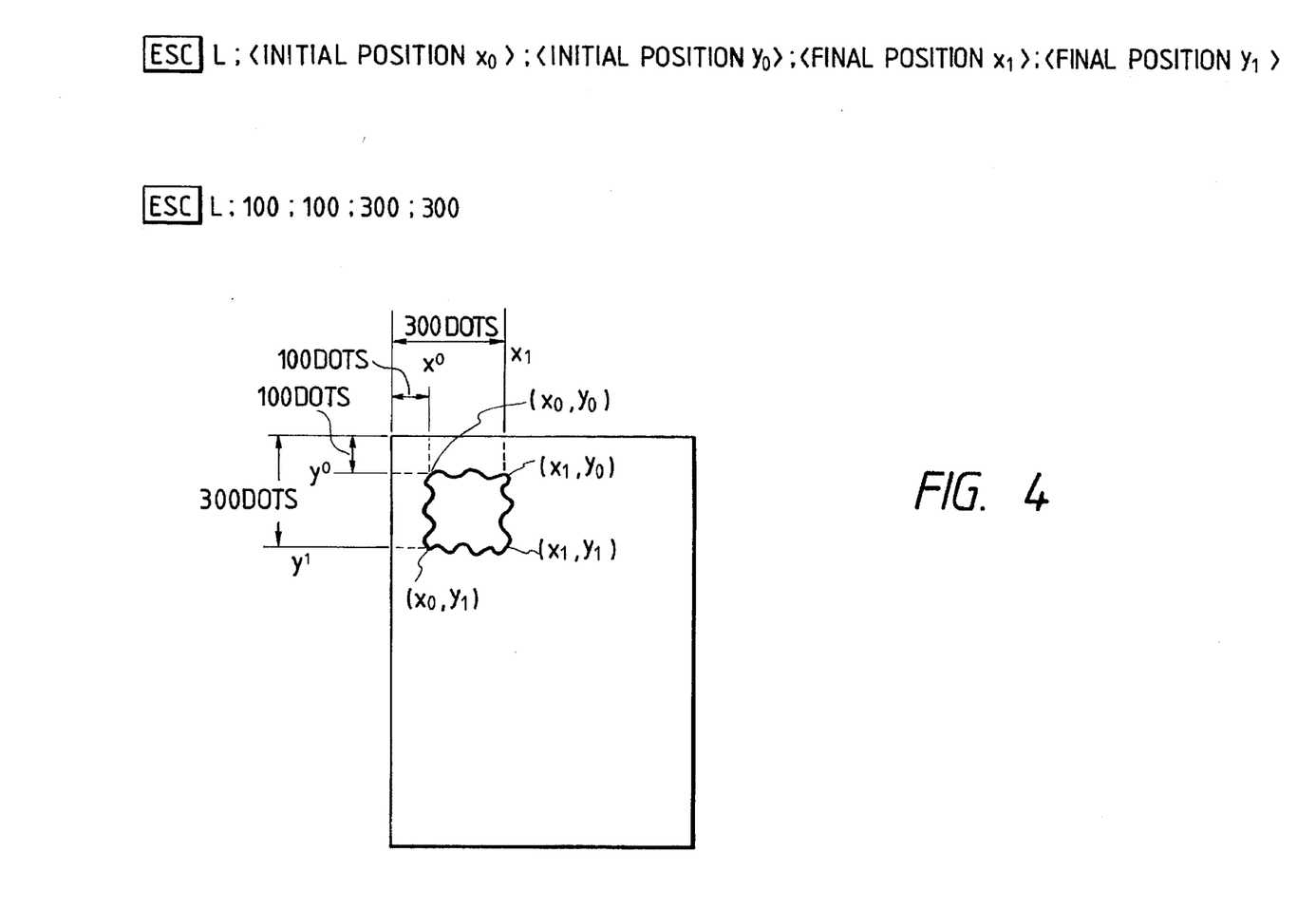
FIG. 4 shows a format of a drawing command of a decoration rule line and an example thereof.
Figure 5:
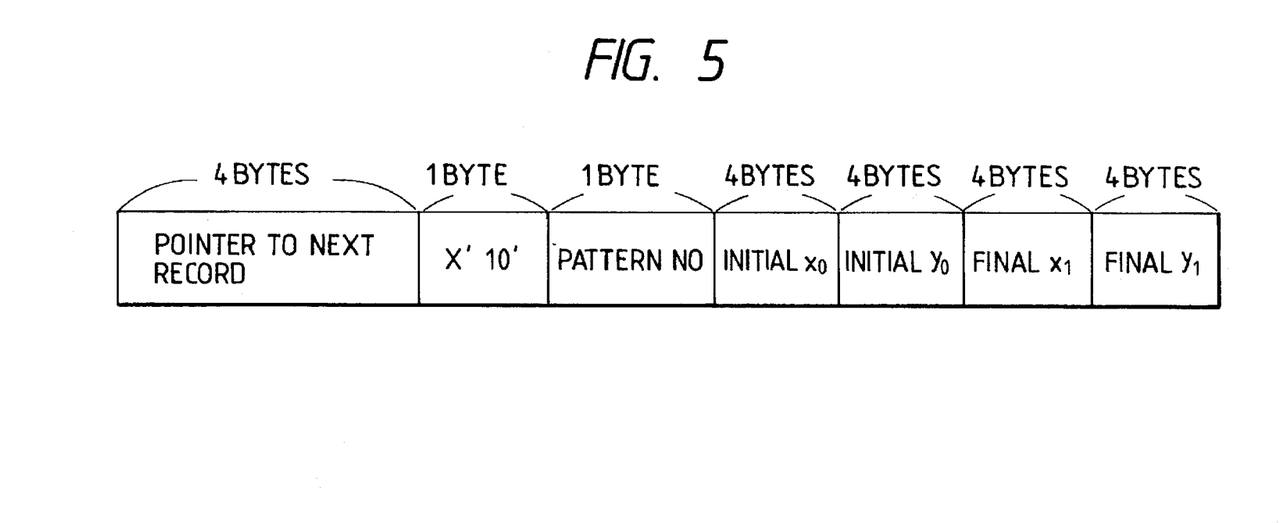
FIG. 5 is a diagram showing a format of a page buffer record of a decoration rule line.

In the output apparatus, a control command to register a pattern and a control command to designate a drawing position are processed with respect to a decoration rule line. FIG. 3 shows a format of the control command to register a pattern and an example thereof. When the control command is received, the CPU 2 assures data according to the designated width and height into the pattern memory 3 and stores the decoration rule pattern together with the information regarding the pattern number, width, and height. ESC in FIG. 3 denotes an escape code "X'1B'". The same shall also apply hereinbelow. FIG. 4 shows a format of the position designation command to draw a decoration rule line and an example thereof. When the control command is received, the CPU 2 stores the contents regarding the pattern number, position, and the like in the memory in the CPU 2 in a form of a page buffer record so long as improper pattern number, position, and the like do not exist as a result of the instructions. In FIG. 4, the initial position is set to $(x_0, y_0)$ in the horizontal direction, $(x_1, y_0)$ in the direction of an angle of 90°, $(x_1, y_1)$ in the direction of 180°, and $(x_0, y_1)$ in the direction of 270°. FIG. 5 shows a data format for the page buffer. In the above case, the position is corrected so that the top or left position with respect to the paper surface is set to an initial point. "X'10'" denotes a decoration rule drawing record.

Figure 6:
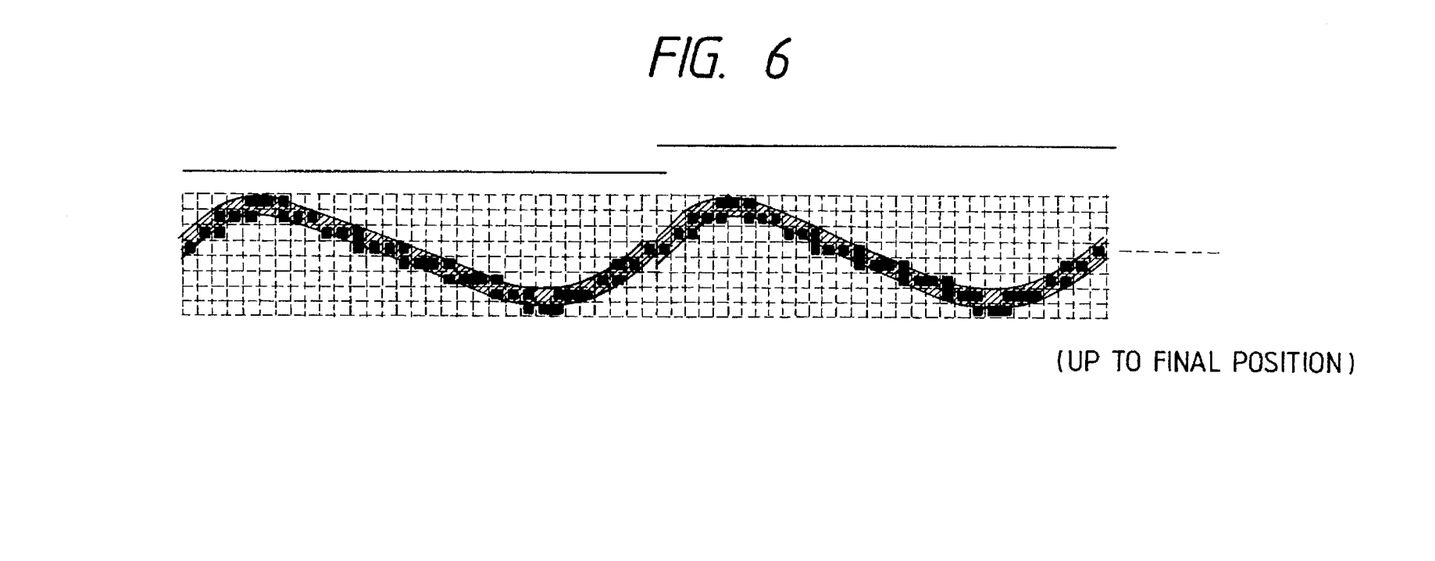
FIG. 6 is a diagram showing the drawing of a horizontal line.

The CPU 2 sequentially processes the page buffer record upon output. However, the CPU 2 executes the following processes in the case of the record of the decoration rule drawing. First, a check is made to see if a decoration rule is a horizontal line, a vertical line, or a rectangle on the basis of the coordinate values to designate a position. FIG. 6 diagrammatically shows the drawing of a horizontal line of a decoration rule line. In the case of the horizontal line, a writing position of the pattern is obtained and the patterns in the pattern memory 3 are sequentially stored in the frame memory 4. After completion of the processes corresponding to the width of pattern, the pattern is stored from the subsequent position. On the other hand, upon final transfer, the pattern is masked and stored so as to draw until the final position. After the process of one line is finished, the process for the next line in the vertical direction is executed and processes equal in number to the lines in the height direction of the line pattern are executed. In the case of a vertical line, the writing position of the pattern is obtained and the patterns in the pattern memory 3 are stored in the frame memory 4 in the width direction of the pattern. After completion of the processes corresponding to the width of the pattern, the processes in the next height direction are executed. After the processes corresponding to the height of pattern are finished, the process of the head of the pattern is performed from the next position. The patterns are sequentially stored in the height direction. The processes are executed until the final position in the height direction is reached.

Figure 7:
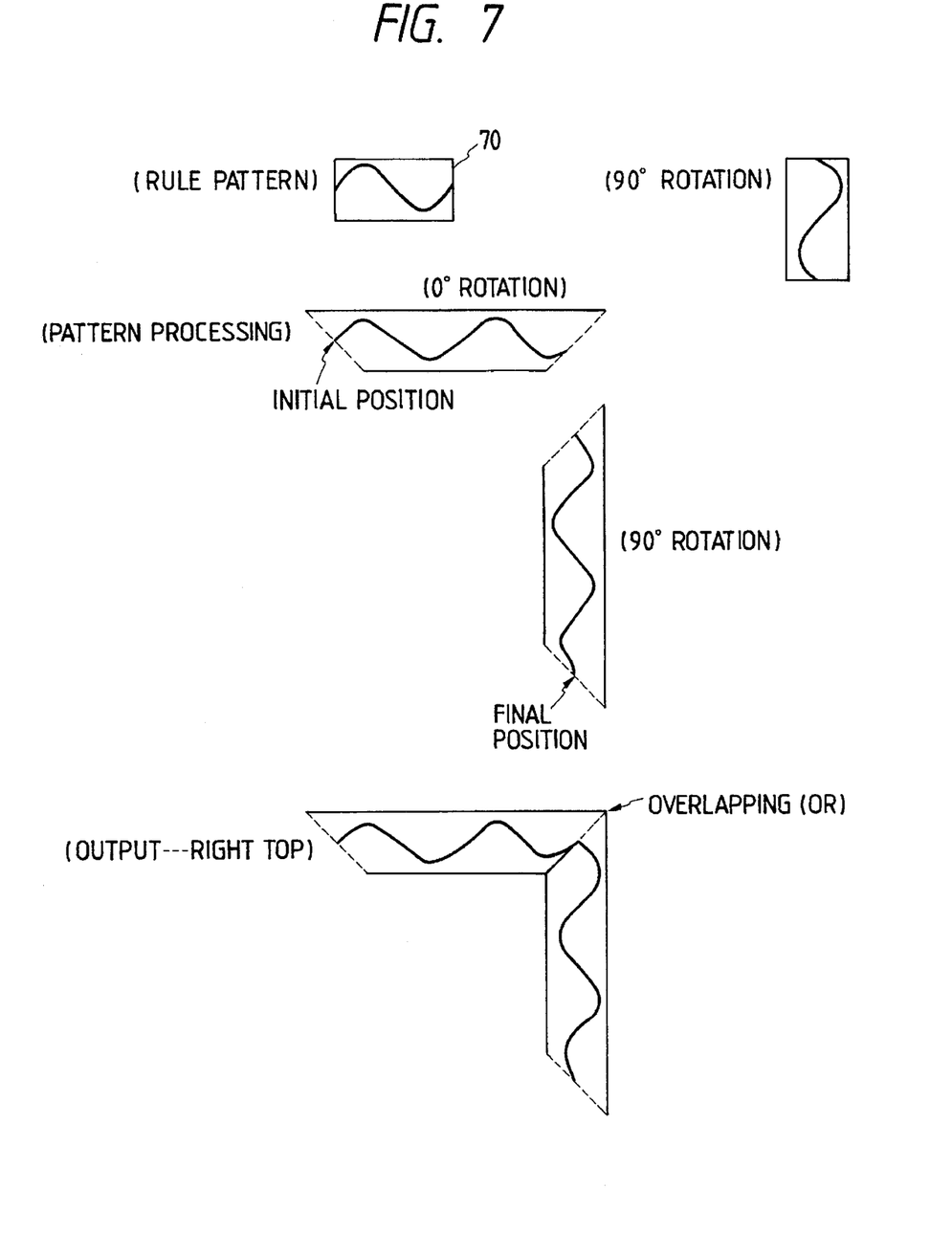
FIG. 7 is a diagram showing the drawing of a rectangle.

FIG. 7 schematically shows the drawing of a rectangle of a decoration rule line and illustrates the drawing at a corner (line edge) of a rectangle. A rectangle is drawn in a manner such that a rule pattern is sequentially rotated clockwise by angles of 0°, 90°, 180°, and 270° from the designated initial position, the corner (line edge) of the rectangle is cut at 45° and the resultant lines are sequentially overlapped. The line edge can be cut at 45° by executing a masking process with a special value at the start of the drawing of each line segment.

Figure 8:
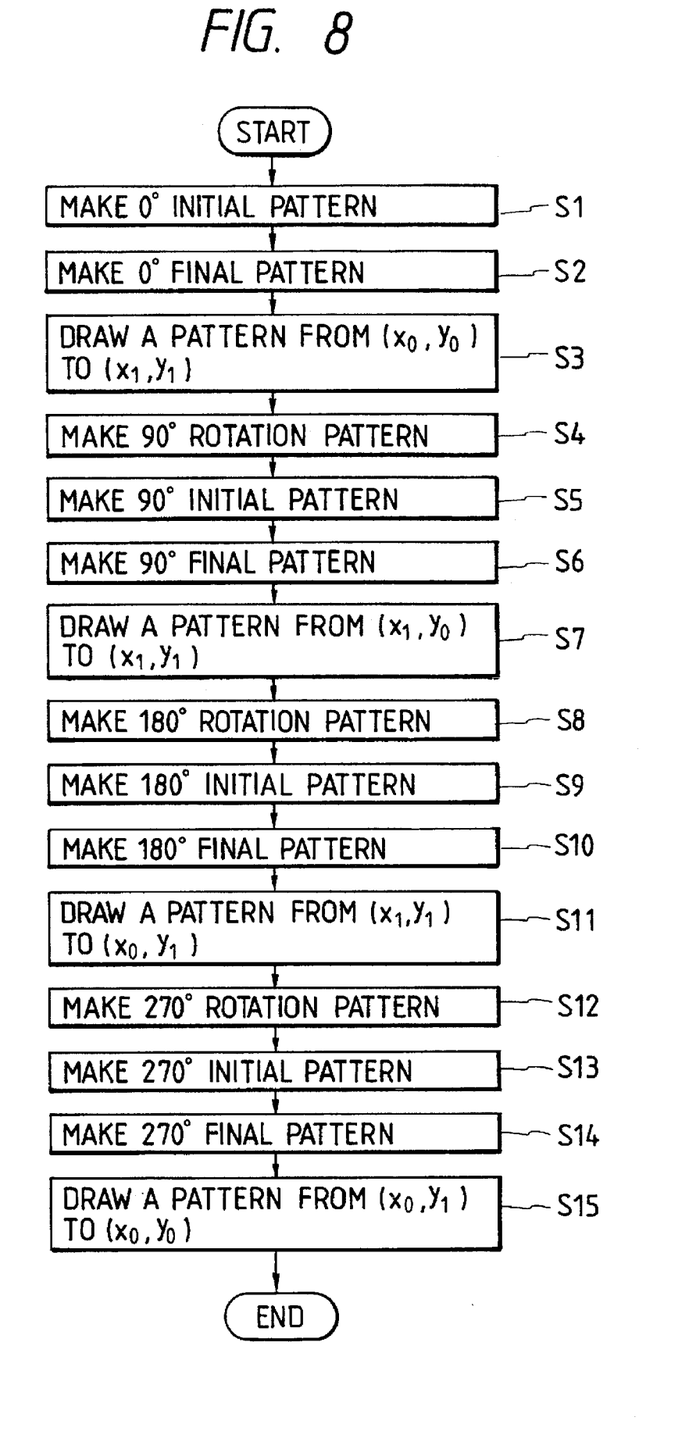
FIG. 8 is a flowchart according to an embodiment.

FIG. 8 shows a flowchart the the drawing of the rectangle shown in FIG. 4. The flowchart will now be described with reference to FIGS. 4 and 7.

Figure 9:
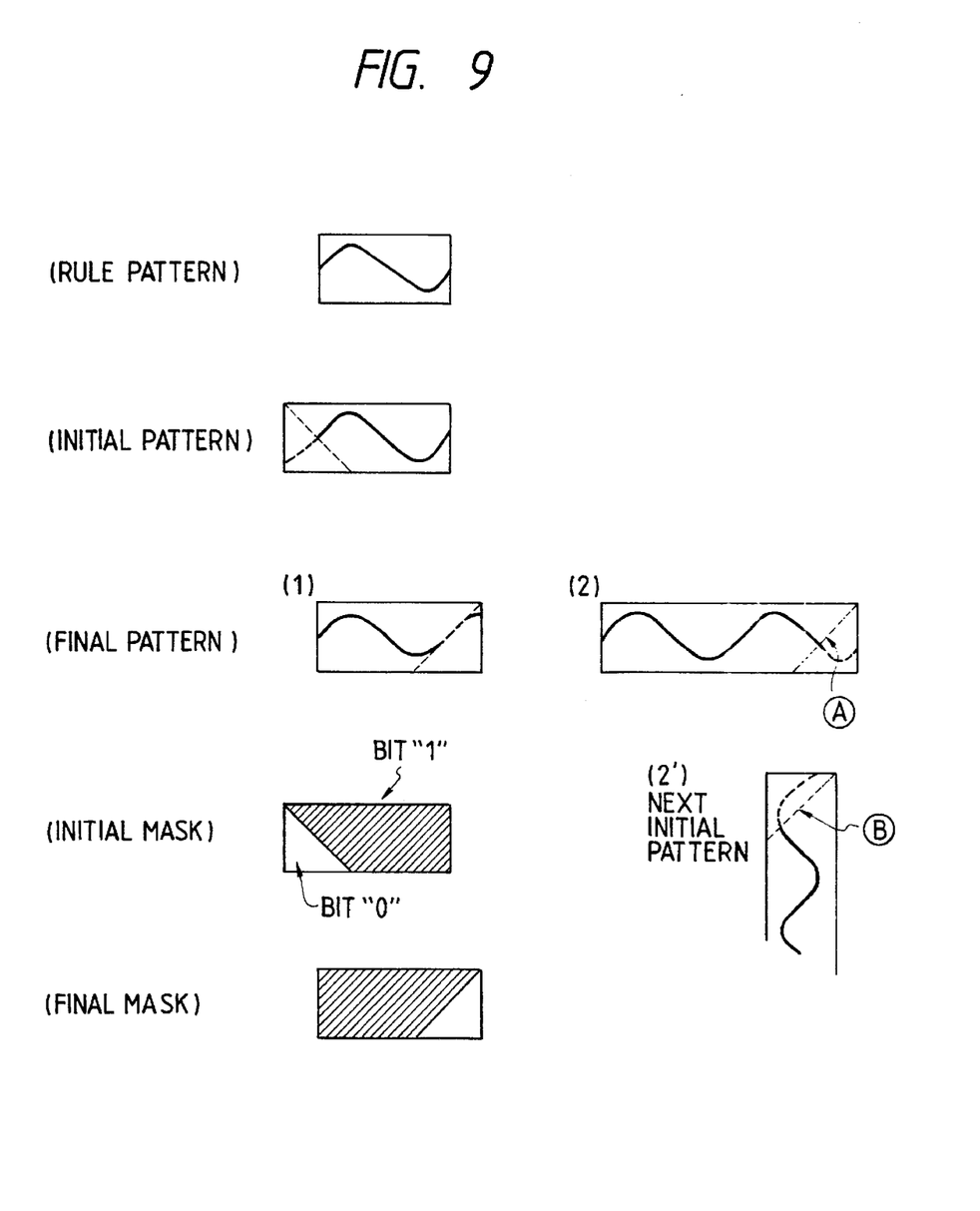
FIG. 9 is a diagram showing a line edge process.

First, in step S1, a 0° initial pattern of a decoration rule rectangular pattern shown in FIG. 7 is formed on the basis of, for instance, the registration pattern shown in FIG. 3. A 0° final pattern is formed in step S2. FIG. 9 shows examples of those patterns. A pattern is drawn from $(x_0, y_0)$ to $(x_1, y_0)$ in Step S3. However, unlike the conventional method, after the 0° initial pattern was drawn, the registration rule patterns shown in FIG. 3 are coupled as shown in FIG. 6, that is, they are adhered in a manner such that tiles are stuck. Finally, the 0° final pattern is drawn, thereby completing the drawing into the memory from $(x_0, y_0)$ to $(x_1, y_0)$. In a manner similar to the above, the drawing of a rectangular decoration rule is finished. Explanation thereof will now be simply made. In step S4, a 90° rotation pattern shown in FIG. 7 is formed. A 90° initial pattern is formed in step S5. A 90° final pattern is formed in step S6. A pattern is drawn from $(x_1, y_0)$ to $(x_1, y_1)$ in step S7 in a manner similar to the above. By the above processes, the 0° rule line and the 90° rule line are coupled as shown in an overlapped image of the right top portion of an output shown in FIG. 7. In the next steps S8 to S11, a pattern is drawn from $(x_1, y_1)$ to $(x_0, y_1)$ on the basis of the 180° rotation pattern. In steps S12 to S15, a pattern is drawn from $(x_0, y_1)$ to $(x_0, y_0)$ on the basis of the 270° rotation pattern. Thus, a decoration rule rectangle shown in FIG. 4 is drawn.

FIG. 9 is a diagram showing the details of a line edge process. For a pattern whose length is 0 to two times as long as the original pattern, an initial pattern and a final pattern which were subjected to processes by using initial/final masks are prepared. As shown in (2) and (2') in FIG. 9, the original patterns differ depending on a length of each line segment. That is, each pattern is formed so that a point Ⓐ continues to a point Ⓑ by counter means for deciding a drawing position and portion of the pattern. However, the rule portion shown by a broken line in the diagram is not generated to mask.

FIG. 10 is a cross sectional view showing an internal structure of a laser beam printer (hereinafter, abbreviated to an LBP) which is applied to the embodiment. The LBP can register a character pattern, a regular format (form data), and the like from a data source (not shown).

In the diagram, reference numeral 1000 denotes an LBP main body (corresponding to the controller 1 in FIG. 1). The LBP main body 1000 can receive and store character information (character code) and rule data which are supplied from the host computer (8 in FIG. 1) connected to the outside, control command for pattern registration, form information, macro command, etc. and forms a corresponding character pattern, form pattern, or the like in accordance with the varied information (including any commands). Then, an image is formed on a recording paper as a recording medium. Reference numeral 1012 denotes an operation panel (6 in FIG. 1) on which switches for operation, an LED display, and the like are arranged. Reference numeral 1001 denotes a printer control unit for controlling the whole LBP 1000 and analyzing character information or the like which is supplied from the host computer. The printer control unit 1001 mainly converts character information into a video signal of a corresponding character pattern and supplies the video signal to a laser driver 1002.

The laser driver 1002 drives a semiconductor laser 1003 and on/off switches a laser beam 1004 which is emitted from the semiconductor laser 1003 in accordance with an input video signal. The laser beam 1004 is transferred to the right and left by a rotary polygon mirror 1005 and scans on an electrostatic drum 1006. Thus, an electrostatic latent image of a character pattern is formed on the drum 1006. After the latent image was developed by a developing unit 1007 arranged around the drum 1006, it is copy transferred onto the recording paper. A cut sheet is used as the recording paper. The cut sheets are enclosed in the paper cassette 1008 attached in the LBP 1000. The cut sheets are picked up and fed one by one into the apparatus by a paper feed roller 1009 and conveying rollers 1010 and 1011 and are supplied to the drum 1006.

[Other Embodiments]

Although the above embodiment has been described with respect to an output onto a paper by the laser beam printer, the invention can be also applied to an output on a screen such as a CRT.

Although the embodiment has been described with respect to the pattern generation by the firmware, the invention can be also similarly applied to pattern generation by the hardware. In particular, the invention is effective to generate a horizontal or vertical line.

Although the above embodiment has been described with respect to the case where a rectangle is generated by only a cutting process which cuts at 45°, it is also possible to select either a mode in which a pattern is not cut or a mode in which a pattern is cut at 45° by a control command. The invention can be also applied to other cutting methods (for example, an arc).

As described above, there is an advantage that a decoration rule line can be drawn at a high speed by rotating a pattern and repetitively generating a pattern.

What is claimed is:

1. A rule pattern generating apparatus comprising:

memory means for storing a base dot pattern prepared in advance for use in generating a rule line;

means for forming, from the base dot patten stored in said memory means, modified dot patterns, by cutting off, at a 45° angle, an end of the base dot pattern; and means for generating a corner of a frame comprising rule lines, by combining the modified dot patterns formed by said forming means with each other.

2. An apparatus according to claim 1, wherein the base dot pattern is received from an external apparatus and stored in said memory means.

3. An apparatus according to claim 2, wherein said generating means generates the corner by rotating one of the modified dot patterns formed by said forming means, then combining the cut ends of the modified dot patterns.

4. An apparatus according to claim 1, wherein said apparatus comprises a printer control apparatus.

5. A rule pattern generating method comprising the steps of:

storing, in a memory means, a base dot pattern prepared in advance for use in generating a rule line;

forming, from the base dot pattern stored in said storing step, modified dot patterns, by cutting off, at a 45° angle, an end of the base dot pattern; and generating a corner of a frame comprising rule lines, by combining the modified dot patterns formed in said forming step with each other.

6. A method according to claim 5, wherein said method is carried out in an apparatus including the memory and the base dot pattern is received from an external apparatus and stored in the memory.

7. A method according to claim 5, wherein said generating step includes generating the corner by rotating one of the modified dot patterns formed in said forming step, then combining the cut ends of the modified dot patterns.

8. A method according to claim 5, wherein said method is carried out in a printer control apparatus.

9. A rule pattern generating apparatus comprising:

memory means for storing a base dot pattern prepared in advance for use in generating a rule line;

means for forming, from the base dot patten stored in said memory means, modified dot patterns, by cutting off, at a 45° angle, an end of the base dot pattern;

means for generating a corner of a frame comprising rule lines, by combining the modified dot patterns formed by said forming means with each other; and means for printing the frame with the corner generated by said generating means.

10. An apparatus according to claim 9, wherein the base dot pattern is received from an external apparatus and stored in said memory means.

11. An apparatus according to claim 9, wherein said generating means generates the corner by rotating one of the modified dot patterns formed by said forming means, then combining the cut ends of the modified dot patterns.

12. A rule pattern generating method comprising the steps of:

forming, from a base dot pattern stored in advance for use in generating a rule line, modified dot patterns, by cutting off, at a 45° angle, an end of the base dot pattern;

generating a corner of a frame comprising rule lines, by combining the modified dot patterns formed in said forming step with each other; and outputting the frame with the corner generated in said generating step.

13. A method according to claim 12, wherein said method is carried out in an apparatus including the memory and the base dot pattern is received form an external apparatus and stored in the memory.

14. A method according to claim 12, wherein said generating step includes generating the corner by rotating one of the modified dot patterns formed in said forming step, then combining the cut ends of the modified dot patterns.

15. A method according to claim 12, wherein said method is carried out in a printer control apparatus.

16. A storage medium storing a program for use in an information processing apparatus, with the program comprising the steps of:

forming, from a base dot pattern stored in a memory, modified dot patterns, by cutting off, at a 45° angle, an end of the base dot pattern; and generating a corner of a frame comprising rule lines, by combining the modified dot patterns formed in said forming step with each other.

17. A storage medium according to claim 16, wherein the program is carried out in an apparatus including the memory, and wherein the base dot pattern is received from an external apparatus and stored in the memory.

18. A storage medium according to claim 16, wherein said generating step includes generating the corner by rotating one of the modified dot patterns formed in said forming step, and then combining the cut ends of the modified dot patterns.

19. A storage medium according to claim 16, wherein said program is carried out in a printer control apparatus.

* * * * *

UNITED STATES PATENT AND TRADEMARK OFFICE
CERTIFICATE OF CORRECTION

PATENT NO.  : 5,644,659

DATED       : July 1, 1997

INVENTOR(S) : KAZUYUKI HONDA

It is certified that error appears in the above-identified patent and that said Letters Patent is hereby corrected as shown below:

ON TITLE PAGE

[56] REFERENCES CITED U.S. PATENT DOCUMENTS

"Suzwki et al." should read --Suzuki et al.--;

[57] ABSTRACT

Line 13, "a" should read --the--.

COLUMN 1

Line 19, "1" should read --"|"--;
   Line 27, "are that" should read --are the--;
   Line 30, "TEE" should read --THE--.

COLUMN 2

Line 17, "TEE" should read --THE--;
   Line 52, "hereinlater)" should read --hereinbelow--.

COLUMN 3

Line 2, "ESC" should read --ESC--;
   Line 42, "pattern" (first occurrence) should read --the pattern--;
   Line 57, "the the" should read --for the--.

UNITED STATES PATENT AND TRADEMARK OFFICE
CERTIFICATE OF CORRECTION

PATENT NO.   : 5,644,659

DATED        : July 1, 1997

INVENTOR(S): KAZUYUKI HONDA

It is certified that error appears in the above-identified patent and that said Letters Patent is hereby corrected as shown below:

<u>COLUMN 4</u>

```
     Line 28, "cross sectional" should read
     --cross-sectional--;
     Line 38, "command" should read --commands--;
     Line 39, "command," should read --commands,--;
     Line 57, "on" should be deleted.
```

<u>COLUMN 5</u>

```
     Line 3, "a" should be deleted;
     Line 25, "patten" should read --pattern--.
```

<u>COLUMN 6</u>

```
     Line 3,  "patten" should read --pattern--;
     Line 31, "form" should read --from--.
```

Signed and Sealed this

Thirtieth Day of December, 1997

Attest:

BRUCE LEHMAN

*Attesting Officer*              *Commissioner of Patents and Trademarks*